United States Patent [19]

Kent

[11] Patent Number: 4,613,979
[45] Date of Patent: Sep. 23, 1986

[54] CONTINUOUS, AUTOMATIC RESET OF SYNCHRONOUS DATA RECEIVER UPON DETECTION OF LOSS OF SYNC

[75] Inventor: Dallas L. Kent, Evanston, Ill.

[73] Assignee: Zenith Electronics Corporation, Glenview, Ill.

[21] Appl. No.: 606,443

[22] Filed: May 3, 1984

[51] Int. Cl.⁴ .............................................. H04L 7/10
[52] U.S. Cl. ..................................... 375/108; 375/112
[58] Field of Search ............... 375/108, 112, 106, 114; 328/63; 370/100

[56] References Cited

U.S. PATENT DOCUMENTS 4,316,284  2/1982  Howson .............................. 375/108

OTHER PUBLICATIONS

AMI American Microsystems, Inc. spec sheet "Universal Synchronous Receiver/Transmitter" S2350 pp. 5.119–5.126.

Primary Examiner—Marc E. Bookbinder
Assistant Examiner—M. Huseman

[57] ABSTRACT

Recovery from loss of synchronization of a synchronous serial receiver is assured by automatic reset circuitry described herein. In a synchronous serial data receiver, synchronization, data and fill characters are received from a synchronous signal transmitter. The synchronization character is provided at the beginning of each data record to establish receiver synchronization before control data is received. The fill character is used to maintain synchronization during data reception when no useful data is available for transmission. Detection of either of these characters indicates receiver synchronization with the received data. Failure to detect either of these characters during a predetermined time interval is sensed as an error indicating that the receiver has lost synchronization with the received data. The reset signal sequence is provided to the synchronous serial data receiver to reinitialize receiver operation to an initial set of conditions in order to re-synchronize the receiver with the received serial data. The reset signal sequence also resets automatic reset signal generating circuitry to permit detection of the next synchronization or fill character. The reset signal sequence is provided as long as is necessary to accomplish receiver resynchronization.

9 Claims, 2 Drawing Figures

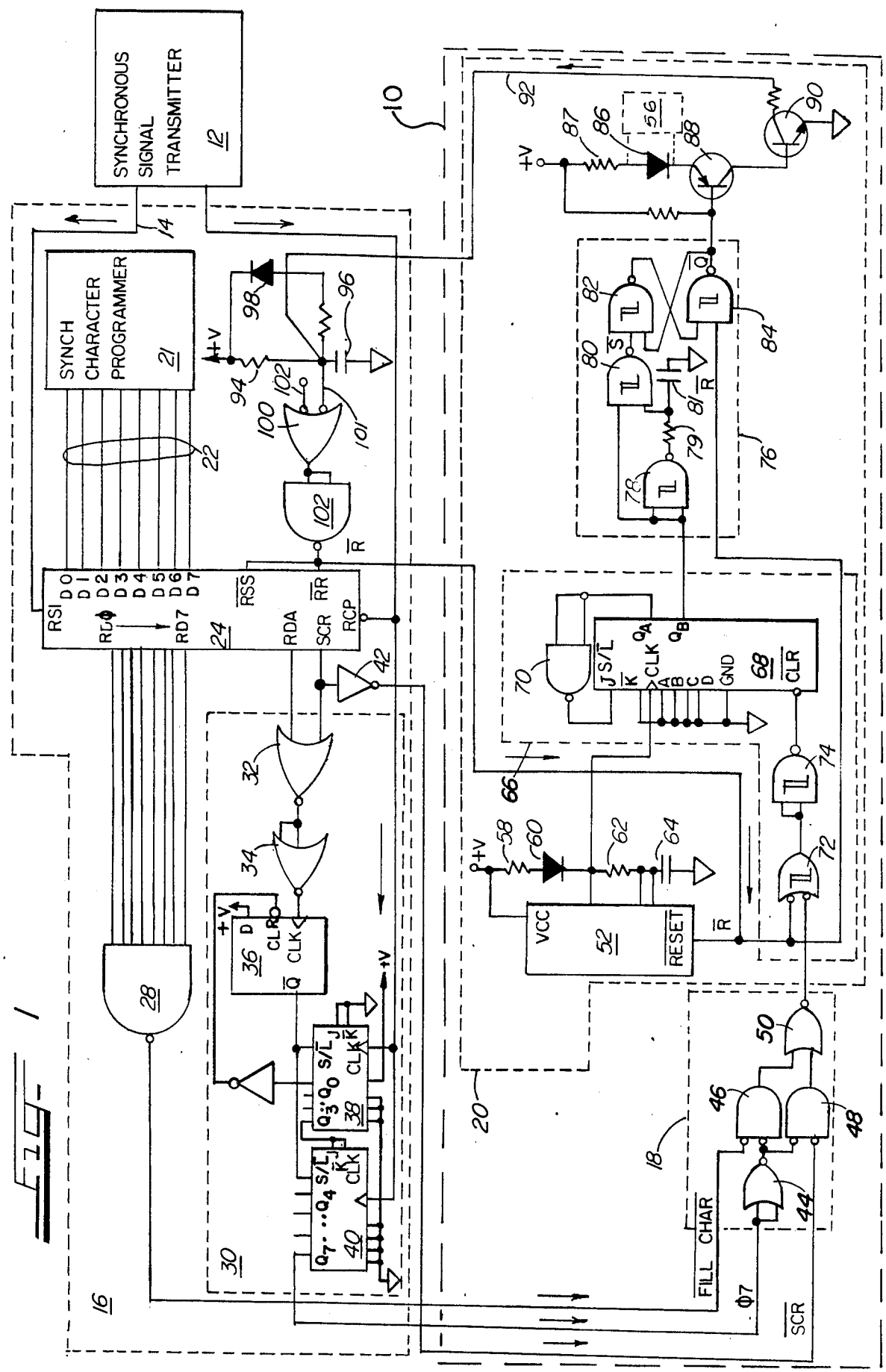

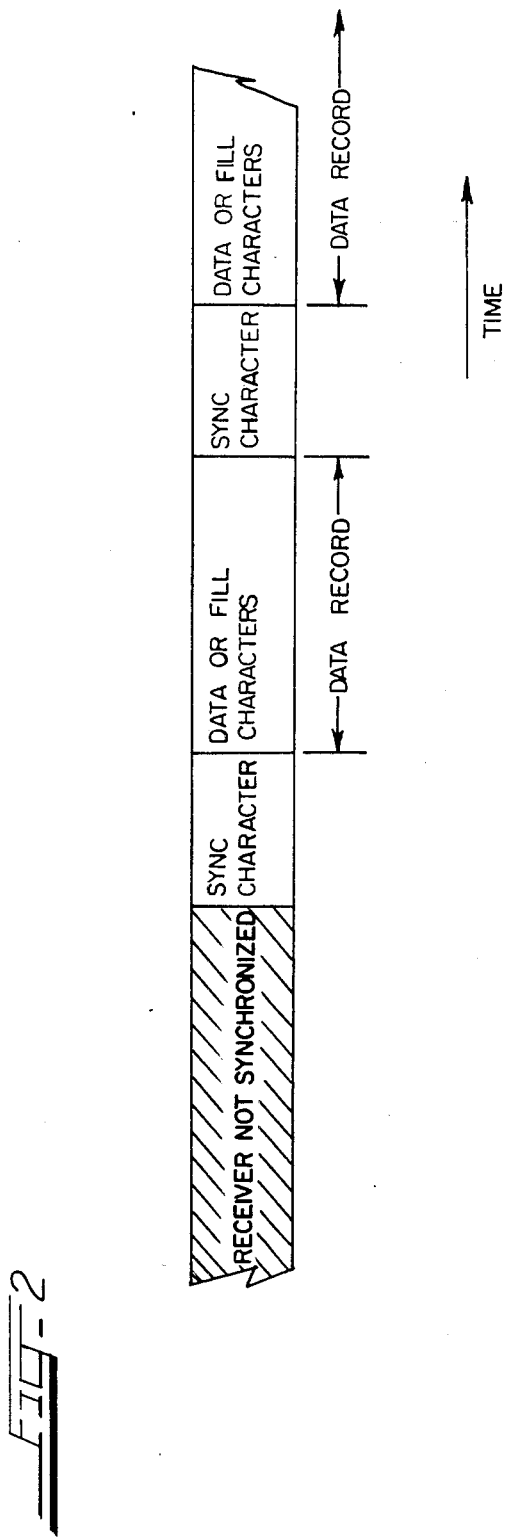

CONTINUOUS, AUTOMATIC RESET OF SYNCHRONOUS DATA RECEIVER UPON DETECTION OF LOSS OF SYNC

BACKGROUND OF THE INVENTION

This invention relates generally to synchronous communications systems and is particularly directed to establishing and maintaining synchronization of a synchronous serial data receiver with transmitted serial data.

Synchronization between transmitter and receiver is required in most communications systems. For example, the signal driving a video display is comprised of a video component and a synchronization component. While the video signal portion includes picture information such as luminance and chrominance signals, the synchronization signal portion includes pulse-like signals occurring both at the horizontal and vertical scan rates which are interspersed between the scan interval of the picture component for synchronizing video display scan with the receipt of the video signals. In another example, downstream signals in a cable television (CATV) system include a video signal portion as well as subscriber identity and program authorization information. The latter information is typically provided in the transmitted signal during the vertical retrace interval and the subscriber terminal must therefore not only be capable of synchronizing video display sweep with received video information, but also of synchronizing the subscriber decoder with the received subscriber identity and program authorization data.

In synchronous communications systems, synchronization between transmitter and receiver is generally provided by means of two alternative approaches. In one approach, the transmitter and receiver are each individually driven by separate clocks relative to a mutual time reference. This requires highly accurate timing provided by generally expensive timing devices in both the transmitter and the receiver. More commonly, receiver timing is established by received signal timing. The aforementioned video signal sync pulse is an example of this. In non-video related oommunications systems the received signal may include a sync pulse, or pulses, uniquely positioned in the received data bit stream to provide receiver synchronization.

Generally, once synchronization is lost, a synchronous signal receiver must be reset, or initialized, to a set of initial conditions before synchronization can be restored. This is particularly true in the case of digital signal receivers which frequently are under the control of a microprocessor or micro-computer. In these systems, the sequence of operations in the receiver must be initialized to a predetermined location in the operating program for proper receipt and processing of the transmitted data. To date, attempts to re-establish receiver synchronization have either required manual intervention by an operator in resetting the receiver to a predetermined set of initial conditions, or have involved complicated and expensive fault detection arrangements which are generally unable to rapidly restore synchronization and thus suffer from communication link drop-outs and an associated loss of data.

The present invention is intended to overcome the aforementioned limitations of the prior art by providing a data error reset system for a synchronous signal receiver which is responsive to groups of timing bits, or characters, in the received serial data for determining if the receiver is synchronized to serial data and if the receiver is not synchronized, for automatically re-initializing the receiver to a predetermined operating state for re-establishing synchronization with data from a synchronous serial transmitter.

OBJECTS OF THE INVENTION

Accordingly, it is an object of the present invention to provide improved data communication in a synchronous signal communications system.

Another object of the present invention is to provide a means for determining if the synchronous serial receiver is synchronized to received serial data.

Another object of the present invention is to provide automatic reset of a synchronous signal receiver following loss of synchronization with the received data.

Yet another object of the present invention is to provide improved received signal synchronization in a synchronous signal receiver using timing characters provided in the transmitted serial data record.

A further object of the present invention is to provide more reliable communication in a synchronous serial data transmitter-receiver network.

A still further object of the present invention is to provide reliable, unattended operation in a synchronous signal receiver.

Still another object of the present invention is to insure synchronous signal receiver-transmitter operation by continuously monitoring received data and automatically correcting for out-of-sync conditions.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, in which:

FIG. 1 is a simplified combined schematic and block diagram of a data error reset system for use in a synchronous signal receiver in accordance with the present invention; and FIG. 2 illustrates the format of a typical synchronous signal received and processed by the synchronous signal receiver with automatic data error reset of FIG. 1.

DESCRIPTION OF THE PREFERRED EMBODIMENT

Referring to FIG. 1, there is shown a simplified combined schematic and block diagram of a data error reset system 10 for use in a synchronous serial receptor 16 in accordance with the present invention.

Data messages are transmitted as a contiguous character stream, bit synchronous with respect to a clock and character synchronous with respect to a synchronization character preceding each message. A data message in the form of a bit stream is provided from a synchronous signal transmitter 12 via a data bus 14 to a synchronous serial data receptor 16. Although FIG. 1 shows the synchronous signal transmitter 12 coupled to the serial data receptor 16 by means of a data bus 14, the present invention also contemplates an electromagnetic wave, e.g., an RF signal, link between the transmitter and receiver. The synchronous serial data receptor 16 includes a synchronous serial data receiver circuit 24, an eight phase clock 30, a fill character decoder which includes NAND gate 28 and various other elements which are conventional in nature and not shown in FIG. 1.

Referring to FIG. 2, there is shown the format of the received signal provided from the synchronous signal transmitter 12 to serial data receptor 16. This signal includes a plurality of bytes, including a first synchronization character byte and a plurality of control data bytes and possibly fill character bytes. The synchronization character byte is used to establish synchronization between the serial data receptor 16 and the received serial data signal by performing bit by bit matching between a receiver shift register and a receiver synchronization register, both of which are within the synchronous serial data receptor 16 and neither of which are shown for simplicity sake. The synchronization character is transmitted at the beginning of each data record to establish receiver synchronization just before control data is transmitted. A nonsynchronous condition may occur either upon a loss of synchronization or upon initial system power-up. The synchronization character is programmed into the receiver synchronization character register of the synchronous serial data receiver 24 by means of a synchronization character programmer 21 which is coupled to the synchronous serial data receiver 24 via data lines 22 which are hardwired to the D0 through D7 input pins of the synchronous serial data receiver 24. The synchronization character is strobed into the synchronous serial data receiver 24 when its Receiver Synchronization Strobe (RSS) pin receives a negative pulse. Receipt of the synchronization character at its Receiver Serial Input (RSI) pin causes the synchronous serial data receiver 24 to initialize its operation to a predetermined state in preparation for receipt of control data from the synchronous signal transmitter 12. The fill character is transmitted when no useful data is available for transmission and is used to maintain synchronization during data reception.

Control data is provided in the form of serial data to the RSI input pin of the synchronous serial data receiver 24. A timing signal from the synchronous signal transmitter 12 is provided to the Receiver Clock Pulse (RCP) input pin of the synchronous serial data receiver 24. A negative transition of the RCP input to the serial data receiver 24 initiates a sampling of the control data provided to the RSI input thereof. In a preferred embodiment, the synchronous serial data receiver 24 is a S2350 Universal Synchronous Receiver/Transmitter available from American Microsystems, Inc., of Santa Clara, Calif. In the present invention, the synchronous serial data receiver 24 receives the aforementioned signals, processes them in a conventional manner, and provides various outputs described below. Because the synchronous serial data receiver 24 is an off the shelf item used in a conventional manner, its operation and the various components thereof are discussed herein only insofar as they relate directly to the present invention.

In response to the inputs provided thereto, the synchronous serial data receiver 24 generates various outputs. Two of these outputs, a Received Data Available (RDA) signal as well as a Synchronous Character Received (SCR) signal are provided to an 8-phase clock circuit 30. The contents of a synchronous character register (not shown) in the synchronous serial data receiver 24, which has been loaded with the D0 through D7 inputs, is compared with an 8-position shift register (not shown) which has been loaded using the RSI and RCP inputs to the synchronous serial data receiver 24. The contents of the 8-position shift register represent received serial data which is compared with the contents of the synchronous character register. If there is a match between the contents of these two registers, the SCR output line of the synchronous serial data receiver 24 goes high. Transition of the RDA output signal to a high state indicates that the received serial data is available, i.e., that the proper number of data bits have been received and parity has been checked.

The RDA and SCR outputs of the synchronous serial data receiver 24 are provided to respective input pins of NOR gate 32 in the 8-phase clock 30. An RCP clock signal is provided to the CLK inputs of shift registers 38 and 40. When either the RDA or SCR inputs go high, NOR gates 32 and 34, functioning in combination as an OR gate, cause a 1 to be clocked into the CLK input of a D-latch circuit 36 causing its $\overline{Q}$ output to go to 0 and thereby loading the binary bit pattern 00000001 into shift registers 38 and 40. The logic 1 $Q_0$ output of shift register 38 is then coupled for resetting D-latch 36 such that its $\overline{Q}$ output goes high. The logic 1 bit at the $Q_0$ position of register 38 is shifted one position in response to each clock pulse positive edge until it reaches the $Q_7$ position of register 40. When the last increment, or phase, of the 8-phase clock 30 is reached (i.e. when $Q_7$ goes high), the 8-phase clock 30 provides a phase 7 ($\emptyset 7$) timing signal to a decoder circuit 18. Also provided to another input of the decoder circuit 18 is an $\overline{SCR}$ signal from the synchronous serial data receiver 24 via buffer inverter 42.

As described above, the RSI serial data is clocked into an 8-position shift register in the synchronous serial data receiver 24 by means of the RCP clock input thereto. The RSI received serial data is then gated from the shift register to an output register (not shown) and thence to the RD0 through RD7 output pins of the synchronous serial data receiver 24. The RD0 through RD7 parallel outputs are then provided to the input pins of an 8 input NAND gate 28. NAND gate 28 performs a decoding function relative to the RD0 through RD7 outputs from the synchronous serial data receiver 24 and generates a $\overline{FILL\ CHAR}$ (Fill Character) signal which is also provided to decoder circuit 18. With logic high inputs provided to each of the 8 input pins of NAND gate 28, its output will be a logic 0. This space filler character is used to maintain synchronization of the synchronous serial data receptor 16 with transmitter 12 during data reception. The fill character is transmitted when no useful data is available for transmission and is programmed into the synchronous serial data transmitter 12 after power is applied. The fill character is discarded as data by conventional circuitry, which is not shown.

In decoder 18, the $\emptyset 7$ input is provided to both input pins of NOR gate 44. The output of NOR gate 44 is provided to one input of each of active low AND gates 46 and 48. To the other inputs of AND gates 46 and 48 are respectively provided $\overline{FILL\ CHAR}$ and $\overline{SCR}$ signals. At time $\emptyset 7$ the two inputs to NOR gate 44 will be 1, with logic 0 outputs then provided to one input of each of AND gates 46 and 48. If logic 0's are also provided to the other inputs of AND gates 46 and 48, these two gates will provide logic 0's to respective inputs of NOR gate 50 causing a logic 0 to appear on its output. Therefore, if either the $\overline{FILL\ CHAR}$ or the $\overline{SCR}$ signals occur during $\emptyset 7$, decoder circuit 18 will output a logic 0 to an automatic reset circuit 20 preventing an automatic reset cycle. If neither the $\overline{\text{FILL CHAR}}$ nor $\overline{\text{SCR}}$ signals are present during ∅7, decoder circuit 18 will output a logic 1 to the automatic reset circuit 20 allowing an automatic reset cycle after the second clock 52 cycle.

The output from decoder circuit 18 is provided to one input of OR gate 72, to the other input of which is provided an $\overline{\text{R}}$ reset signal from the synchronous serial data receptor 16 as described below. With OR gate 72 having active low inputs, receipt of a logic 0 at either of its inputs will result in a logic 1 being provided to both inputs of NAND gate 74. The output of NAND gate 74 will then be a logic 0 which is provided to the active low $\overline{\text{CLR}}$ input of shift register 68. A logic 0 provided to the $\overline{\text{CLR}}$ input of shift register 68 causes the shift register to be cleared with all of its stages assuming a logic 0 state. Thus, OR gate 72 in combination with NAND gate 74 performs a NOR function with either a logic 0 output from decoder circuit 18 or a RESET output from the synchronous serial data receptor 16 causing shift register 68 to be cleared. Shift register 68 in combination with OR gate 72 and NAND gate 74 forms a digital delay circuit 66.

Also coupled to shift register 68 is a clock circuit 52 which provides a clocking signal to the CLK input of shift register 68. In a preferred embodiment, clock 52 provides a 50 Hz signal to the CLK input of shift register 68. This frequency is slightly less than the rate at which new data records are sequentially provided to the synchronous serial data receptor 16 from transmitter 12. The operating frequency of clock 52 is established by the values of grounded capacitor 64 and resistor 62 and is selected to permit shift register 68 to be cleared each data transmission period which corresponds to an operating cycle of the synchronous serial data receptor 16. A positive voltage source is coupled to the $V_{cc}$ input of clock 52 and to the combination of a current limiting resistor 58 and a light emitting diode (LED) 60. Flashing illumination of the LED 60 indicates that the clock 52 is running.

Shift register 68 is operated in a toggle mode wherein NAND gate 70 couples the QA output of shift register 68 back to its J and $\overline{\text{K}}$ inputs such that logic 1's and 0's are clocked into the shift register 68 in an alternating manner. Logic 1's are shifted to the output of the shift register from $Q_A$ to $Q_B$ and on down sequentially to $Q_D$. During normal operation of the synchronous serial data receptor 16 in which valid data is periodically received from transmitter 12, a logic 0 is provided to the active low $\overline{\text{CLR}}$ input of shift register 68 which, as a result, is cleared each operating cycle of the synchronous serial data receptor 16 when either a fill or synchronization character is received. Each time shift register 68 is cleared, its $Q_B$ output will go to a logic 0. This corresponds to normal operation of synchronous serial data receptor 16.

However, if shift register 68 is not cleared within two cycles of clock 52, its $Q_B$ output will go to a logic 1, whose output is provided to a reset signal generator circuit 76. Reset signal generator circuit 76 is comprised of coupled NAND gates 78, 80, 82 and 84. During normal operation of synchronous serial data receptor 16, the $Q_B$ output of shift register 68 is a logic 0 resulting in a logic 1 $\overline{\text{Q}}$ being output by the reset signal generator 76. However, with shift register 68 no longer cleared periodically by either a logic 0 output from decoder 18 or an $\overline{\text{R}}$ reset signal from NAND gate 102 a logic 1 will be shifted into the second stage of shift register 68 causing the $Q_B$ output to provide a logic 1 to both input pins of NAND gate 78 resulting in a logic 0 being provided via resistor 79 and grounded capacitor 81 to one active low input pin of NAND gate 80. To the other input pin of NAND gate 80 is provided the logic 1 output from the $Q_B$ output pin of shift register 68 resulting in a negative pulse signal being provided to the $\overline{\text{S}}$ input of NAND gate 82. NAND gate 82 in combination with cross-coupled NAND gate 84 forms a flip-flop circuit. Thus, when shift register 68 is no longer cleared by NAND gate 102 or decoder circuit 18, a negative pulse is provided by NAND gate 80 to the $\overline{\text{S}}$ input of NAND gate 82, the output of which is provided to one input of cross-coupled NAND gate 84. The $\overline{\text{Q}}$ output of NAND gate 84 is provided back to the other input of NAND gate 82. The other input to NAND gate 84 is an $\overline{\text{R}}$ reset signal provided from the synchronous serial data receptor 16 as described below. When the $\overline{\text{R}}$ input is not provided to NAND gate 84, a negative $\overline{\text{S}}$ input to NAND gate 82 will result in a low $\overline{\text{Q}}$ output being provided to the base of PNP transistor 88. Therefore, the output from the reset signal generator circuit 76 will be a logic 0 when this circuit is set, that is when the $\overline{\text{S}}$ input to NAND gate 82 goes low, and will be reset by the transition of the $\overline{\text{R}}$ reset input to a low state. Under normal operating conditions, both of these inputs to the flip-flop circuit comprised of NAND gates 82 and 84 are a logic 1 such that it will provide a logic 1 $\overline{\text{Q}}$ output to the base of transistor 88. The $\overline{\text{R}}$ input has priority over the $\overline{\text{S}}$ input such that the $\overline{\text{Q}}$ output is controlled directly by the $\overline{\text{R}}$ input. When the $\overline{\text{R}}$ input is 0, $\overline{\text{Q}}$ will be a logic 1 indicating that serial data receptor 16 is being reset in preparation for becoming synchronized with the received data signals.

The $\overline{\text{Q}}$ output from the reset signal generator circuit 76 drives a transistor network comprised of PNP transistor 88 and NPN transistor 90. A logic 0 $\overline{\text{Q}}$ output from the reset signal generator circuit 76 will result in the turn-on of PNP transistor 88 and the illumination of a light emitting diode (LED) 86 coupled between its emitter and a +V source via resistor 87. Illumination of LED 86 indicates that the synchronous serial data receptor 16 is being reset. Also shown in dotted line form coupled between the +V source and PNP transistor 88 is an aural device 56 which could be used either in place of or in combination with LED 86 to provide an aural indication of the resetting of the synchronous serial data receptor 16. The audio device 56 could be any conventional audio signal generator.

Current through PNP transistor 88 from a +V source via resistor 87 not only turns on LED 86, but also biases NPN transistor 90 on causing current to be drained off of a grounded timing capacitor 96 within the synchronous serial data receptor 16. NPN transistor 90 is coupled to the synchronous serial data receptor 16 via line 92. With NPN transistor 90 rendered conductive, current is drained off of timing capacitor 96 causing the voltage across capacitor 96 to go exponentially toward 0. When the input from capacitor 96 via line 101 to the active low OR gate 100 goes to a logic 0, the output from OR gate 100 goes to a logic 1 causing NAND gate 102 to output a logic 0. A logic 0 output from NAND gate 102 represents a reset signal to the synchronous serial data receptor 16 and indicates to various portions of the data error reset system 10 that the synchronous serial data receptor 16 is being reset. An indication of other system errors is provided via line 102 of OR gate 100 to cause the resetting of the synchronous serial data receiver 24. These other errors could, for example, involve receiver parity, receiver overrun, data byte format, data byte sequence response error, etc. Since the present invention is not concerned with these various sources of system error requiring data receiver reset, these other causes of receiver reset are not further discussed herein.

A reset signal $\overline{R}$ is provided from NAND gate 102 to the RESET input of clock 52 to provide for the resetting thereof. When clock 52 is reset, shift register 68 is cleared with its $Q_B$ output going to a logic 0 in terminating the reset signal provided to the synchronous serial data receptor 16. In addition, the reset signal is provided to the $\overline{R}$ input of NAND gate 84 for resetting the reset signal generator circuit 76 resulting in a logic 1 $\overline{Q}$ output therefrom and the turn-off of the transistor network comprised of transistors 88, 90 as well as LED 86, aural device 56 and the termination of the reset signal to the synchronous serial data receptor 16.

The $\overline{R}$ output of NAND gate 102 is also provided to the $\overline{RR}$ (Receiver Restart) and $\overline{RSS}$ (Receiver Synchronization Strobe) input pins of the synchronous serial data receiver 24 in providing for the resetting thereof. A negative pulse at the $\overline{RR}$ input initiates a search for a synchronization character in the serial data stream by the serial data receiver 24 and results in the resetting thereof and the clearing of various output lines. A negative pulse at the $\overline{RSS}$ input causes the state of the D0 through D7 inputs, i.e., the synchronization character, to be loaded into the receiver synchronization register. The $\overline{RR}$ and $\overline{RSS}$ inputs of the synchronous serial data receiver 24 are active low inputs.

When power is initially applied to the synchronous serial data receptor 16 from the +V source, capacitor 96 is pulled up to a +V voltage via pull-up resistor 94. When the input voltage to OR gate 100 reaches a logic 1, its output to NAND gate 102 is a logic 0 and the output of NAND gate 102 is a logic 1. This output of NAND gate 102 is the $\overline{R}$ reset signal, which when at a logic 1 state indicates that the power up initialization of the synchronous serial data receptor 16 is complete. Synchronous serial data receptor 16 then executes a hardware reset sequence which initializes the synchronous serial data receiver 24. Once initialization is complete, the synchronous serial data receptor 16 begins normal operation as described above.

There has thus been shown a data error reset system in a synchronous signal receiver for resetting the receiver to an initial condition following detection of a loss of synchronization state resulting in the re-synchronization of the receiver with the received serial data stream. Re-synchronization is automatically accomplished by means of a receiver reset circuit which provides a continuous reset signal sequence to the receiver until proper resetting thereof is realized. The reset circuit of the present invention continuously monitors receiver synchronization with the received serial data stream and automatically provides a reset signal to the receiver following detection of loss of sync operation.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In a synchronous serial data communications system wherein a data record is provided to a receiver over a predetermined time interval, said data record preceded by a first timing signal and including a plurality of data words having a second timing signal associated therewith, wherein a second timing signal is provided in the absence of a data word, a system for synchronizing said receiver with said serial data comprising:
   first timing means coupled to said receiver and responsive to said first timing signal for generating a third timing signal during each data word;
   detector means coupled to said receiver and responsive to said first and second timing signals and further coupled to said first timing means and responsive to said third timing signal for providing a disable signal when said first or second timing signal occurs during said third timing signal;
   reset means coupled to said receiver for providing a continuous reset signal to said receiver in initiating the synchronization of said receiver with the received serial data, said reset means further coupled to said detector means and responsive to said disable signal for terminating said reset signal when said first or second timing signal occurs during said third timing signals; and
   second timing means coupled to said detector means and responsive to said disable signal for generating a fourth timing signal greater in duration than said predetermined time interval and for providing said fourth timing signal to said reset means for continuing said disable signal in preventing the resetting of said receiver during receipt of a data record.

2. A system in accordance with claim 1 wherein said second timing signal includes a fill character for maintaining synchronization of said receiver with said serial data when a data record does not contain a data word.

3. A system in accordance with claim 1 wherein said first timing signal includes a synchronization character provided at the beginning of a data record for establishing synchronization between said receiver and the received serial data.

4. A system in accordance with claim 1 wherein said first timing means includes a plurality of coupled shift registers forming a multi-phase clock for generating said third timing signal.

5. A system in accordance with claim 1 wherein said second timing means is reset to an initial condition after said reset signal is provided to said receiver for terminating said reset signal and rendering said reset means responsive to the receipt of a subsequent disable signal.

6. A system in accordance with claim 5 wherein said reset signal is fed back to said reset means in providing for the resetting thereof.

7. A system in accordance with claim 1 further comprising indicator means coupled to said reset means for providing an indication of the resetting of said receiver.

8. A system in accordance with claim 7 wherein said indicator means comprises a light emitting diode for providing a visual indication of the resetting of said receiver.

9. A system in accordance with claim 7 wherein said indicator means comprises aural signal generating means for providing an aural indication of the resetting of said receiver.

* * * * *